United States Patent [19]
Costa et al.

[11] Patent Number: 5,537,205
[45] Date of Patent: Jul. 16, 1996

[54] SELF LEVELING LASER PLUMB ASSEMBLY

[76] Inventors: George J. Costa, 12470 San Vicente, Lakeside, Calif. 92048; Jeff J. Williams, 1425 2nd Ave. #200, Chula Vista, Calif. 91911

[21] Appl. No.: 339,753

[22] Filed: Nov. 15, 1994

[51] Int. Cl.⁶ .................................................. G01C 9/12
[52] U.S. Cl. ........................... 356/250; 33/227; 33/286; 33/DIG. 21
[58] Field of Search .................................. 356/138, 149, 356/248, 250; 33/227, 286, DIG. 21

[56] References Cited

U.S. PATENT DOCUMENTS

| | | | |
|---|---|---|---|
| 3,505,739 | 4/1970 | Abrams | 33/227 |
| 3,858,984 | 1/1975 | Denton et al. | 356/250 |
| 3,911,588 | 10/1975 | Ohneda | 33/286 |
| 4,183,667 | 1/1980 | Denton | 356/149 |
| 4,448,528 | 5/1984 | McManus | 356/149 |

*Primary Examiner*—F. L. Evans
*Attorney, Agent, or Firm*—Charles C. Logan, II

[57] ABSTRACT

A self leveling laser plumb assembly having a battery powered laser unit, a laser unit mounting support, and at least three support legs secured to the bottom of a gimbal ring assembly. The top end of the laser unit mounting support removably receives the laser beam unit. The laser unit mounting support vertically aligns itself by gravity. This allows a beam of light from the laser unit to be directed upwardly to a surface where a predetermined spot can be marked.

6 Claims, 1 Drawing Sheet

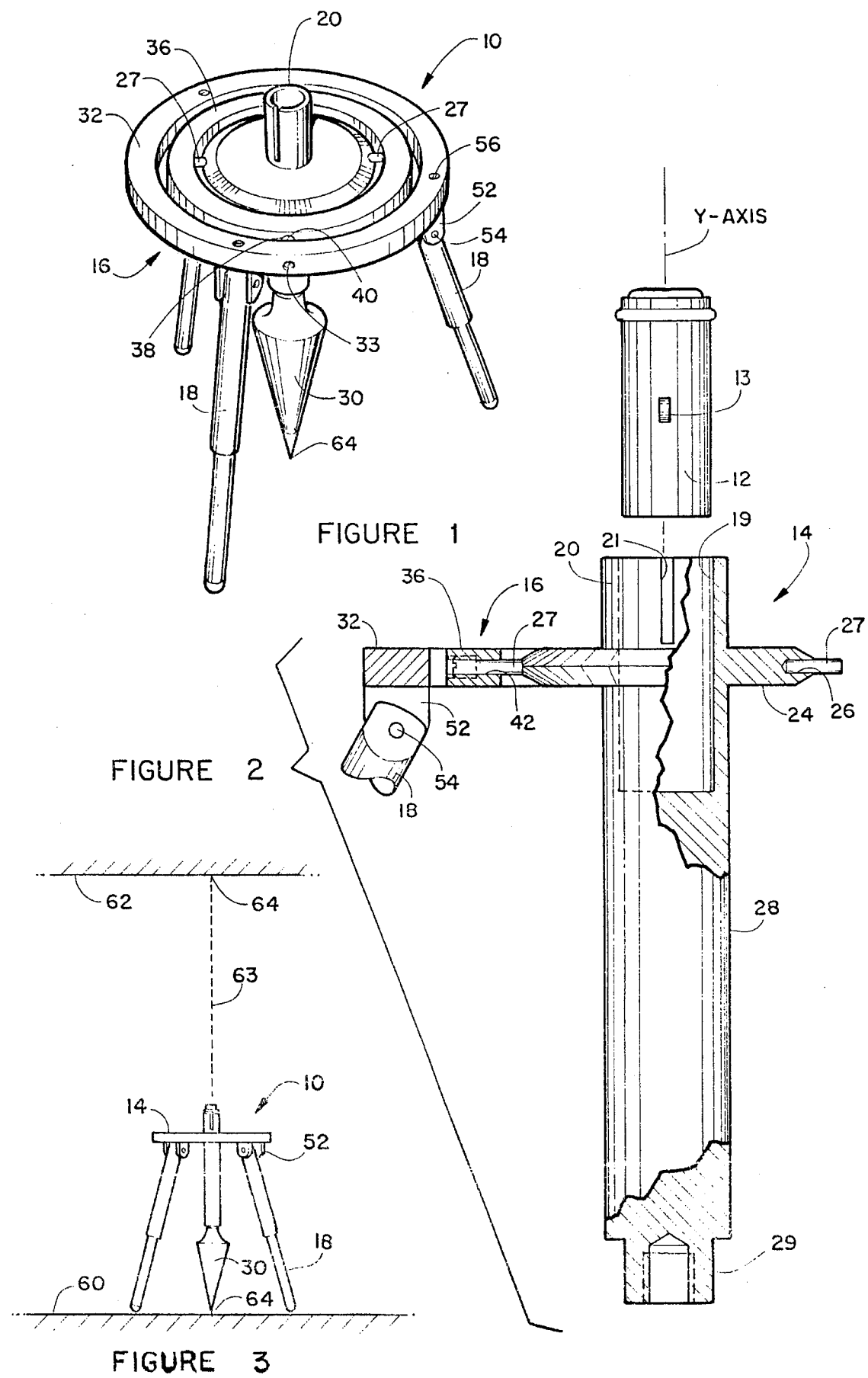

SELF LEVELING LASER PLUMB ASSEMBLY

BACKGROUND OF THE INVENTION

The invention relates to plumb bobs and more specifically to a self leveling laser plumb assembly.

Presently during construction of office buildings and residences it is necessary to have a team of two men set the marks for the tops of the vertical walls. They work from layout lines on the floor of a job site. In order to shoot the top track for a wall a plumb bob must be dropped from above on a string and a mark made on the ceiling above. When the height of the wall is between 10 and 20 feet high two workers are required. One worker is up on the ladder holding the string and the other on the floor marking the plumb bob in position. At times when it is windy, it is very difficult to keep the string vertical.

It is an object of the invention to provide a novel self leveling laser plumb assembly that allows a single worker to set the marks on the ceiling got the top edge of the vertical walls.

It is also an object of the invention to provide a novel self leveling laser plumb assembly that is faster and cheaper to use than existing laser plumb assemblies.

It is another object of the invention to provide a novel self leveling laser plumb assembly that is economical to manufacture and market.

It is an additional object of the invention to provide a novel laser plumb assembly that is self leveling.

SUMMARY OF THE INVENTION

The novel self leveling laser plumb assembly has a battery powered laser beam unit, a laser unit mounting support, a gimbal ring assembly and at least three support legs whose top ends are secured to the gimbal ring assembly. The laser unit mounting support has a vertically extending longitudinal Y-axis. Its top end has a tubular sleeve with a vertical slot and it removably receives the battery powered laser beam unit. The switch that extends radially from the laser beam unit would extend into the slot in the tubular sleeve. The slot assures that the laser beam unit is properly aligned each time it is inserted into the tubular sleeve.

The laser unit mounting support has a plumb bob counterweight secured to its bottom end. The laser unit mounting support functions in the manner of a pendulum so that it always seeks a vertical alignment for its Y-axis. This is accomplished by the gimbal ring assembly. A disc extends transversely from the cylindrical body of the laser unit mounting support and it has a peripheral edge with a pair of 180 degree spaced radially extending bore holes. Pivot pins are inserted into these bore holes and their outer ends are pivotally mounted in bore holes of the inner ring. The inner ring also has a peripheral edge with a pair of 180 degree spaced radially extending bore holes and pivot pins are inserted into these bore holes and their outer ends are received in bore holes on the inner edge of the outer ring.

The manner in which the self leveling laser plumb assembly is utilized will now be described. There are layout lines on the floor of a job-site as to where the walls go. It is necessary to shoot the top track for the wall and this is done by setting the point of the plumb bob on the existing layout marks and the vertically projected laser beam will automatically provide an illuminated spot on the ceiling for marking the top edge of the wall. The self leveling laser plumb assembly can be quickly moved around all over the floor of the job site to obtain the accurate marks on the ceiling.

DESCRIPTION OF THE DRAWING

FIG. 1 is a front perspective view of the novel self leveling laser plumb assembly;

FIG. 2 is an enlarged exploded view of the central portion of the structure of the self leveling plumb assembly; and FIG. 3 is a schematic view illustrating the manner in which the self leveling laser plumb assembly is used.

DESCRIPTION OF THE PREFERRED EMBODIMENT

The novel self leveling laser plumb assembly will now be described by referring to FIGS. 1–3 of the drawing. The laser plumb assembly is generally designated numeral 10. Its main components are battery powered laser beam unit 12, laser unit mounting support 14, gimbal ring assembly 16 and telescoping legs 18.

Battery powered laser beam unit 12 has a longitudinal axis along which its beam is directed. A switch 13 is utilized to energize the unit.

Laser unit mounting support 14 has a vertically oriented longitudinally extending Y-axis. It has a tubular sleeve 20 adjacent its top end and laser beam unit 12 is removably received in bore hole 19. Switch 13 protrudes from the exterior of the laser beam unit and it extends into slot 21 but not through it. A transversely extending disc 24 extends outwardly from tubular sleeve 20 and it has a peripheral edge with a pair of 180 degree spaced radially extending bore holes 26. A cylindrical body 28 extends downwardly from disc 24 and it has a neck portion 29 that is internally threaded to receive a plumb bob counterweight 30.

Gimbal ring assembly 16 has an outer ring 32 having a pair of 180 degree spaced inward radially extending bore holes 33 on its inner surface. Inner ring 36 has a aligned radially extending bore holes 38 on its outer surface and these receive pins 40 to allow the two rings to rotate with respect to each other. Inner ring 36 also has a pair of 180 degree spaced radially extending bore holes 42 in its inner surface that align with radially extending bore holes 26 on the outer peripheral edge of disc 24. Pins 27 are inserted into the respective bore holes and allow inner ring 36 to pivot with respect to laser unit mounting support 14.

At least three telescoping support legs 18 each have a bracket 52 to which they are pivotally secured by a pin 54. Bracket 52 is secured to the bottom surface of outer ring 32 by bolts or screws 56. Each support leg is formed from a pair of tubular telescoping members.

FIG. 3 illustrates the manner in which the self leveling laser plumb assembly 10 is used. It is placed on floor 60 with the plumb bob 30 positioned over a predetermined spot. A laser beam 63 is projected vertically onto ceiling 62 and the spot 64 is marked. A vertical wall can be constructed beneath spot 64.

What is claimed is:

1. A self leveling laser plumb assembly:

a removable elongated self-powered laser beam unit having a longitudinal Y-axis along which a laser beam is projected, said laser beam unit having a front end, a rear end and a substantially cylindrical shape that defines longitudinally extending side walls; a switch for said laser beam unit mounted on said side wall and extending outwardly therefrom;

a vertically oriented elongated mounting support having a top end and a bottom end, a cylindrical bore hole in the top end of said mounting support forms a tubular sleeve for removably receiving said laser beam unit; a transversely extending disc extends outwardly from the side walls of said tubular sleeve and it has a peripheral edge with a pair of 180 degree spaced radially extending bore holes;

a gimbal ring assembly having an outer ring and an inner ring and each having an outer surface, an inner surface and a bottom surface;

said outer ring having a first pair of 180 degree spaced radially inwardly extending bore holes in communication with its inner surface; said inner ring having a first pair of aligned radially extending bore holes in communication with its outer surface; a first pair of pins each having an outer end and an inner end; said outer ends being received in said respective first pair of bore holes in said outer ring and said inner ends being received in said respective first pair of bore holes in said inner ring to allow said inner ring to rotate with respect to outer ring;

said inner ring having a second pair of 180 degree spaced radially inwardly extending bore holes in communication with its inner surface; a second pair of pins each having an outer end and an inner end; said outer ends being received in said respective second pair of bore holes in said inner ring and said inner ends being received in said first pair of bore holes in said disc to allow said disc to rotate with respect to said inner ring;

at least three support legs each having a top end and a bottom end; and means for securing the top ends of said support legs to the bottom surface of said outer ring assembly.

2. A self leveling laser plumb assembly as recited in claim 1 wherein said support legs have telescoping members for adjusting their length.

3. A self leveling laser plumb assembly as recited in claim 1 further comprising a counterweight secured to the bottom end of said laser unit mounting support.

4. A self leveling laser plumb assembly as recited in claim 3 wherein said counterweight is a plumb bob.

5. A self leveling laser plumb assembly as recited in claim 1 wherein said disc is integrally formed with said vertically oriented elongated mounting support and integrally formed of the same material.

6. A self leveling laser plumb assembly as recited in claim 1 further comprising a vertical slot extending downwardly from the top end of said tubular sleeve to allow the switch of said laser beam unit to align and protrude therein.

* * * * *